US008661062B1

(12) United States Patent
Jamail et al.

(10) Patent No.: US 8,661,062 B1
(45) Date of Patent: Feb. 25, 2014

(54) MANAGING ANALYSIS OF ACTIVITY DATA

(75) Inventors: John M. Jamail, Sudbury, MA (US);
Daniel B. Reich, Watertown, MA (US);
Mark F. McLaughlin, Salem, MA (US)

(73) Assignee: EMC Corporation, Hopkington, MA (US)

( * ) Notice: Subject to any disclaimer, the term of this patent is extended or adjusted under 35 U.S.C. 154(b) by 79 days.

(21) Appl. No.: 13/247,859

(22) Filed: Sep. 28, 2011

(51) Int. Cl.
*G06F 17/00* (2006.01)

(52) U.S. Cl.
USPC .............................. 707/802; 709/230; 713/182

(58) Field of Classification Search
None
See application file for complete search history.

(56) References Cited

U.S. PATENT DOCUMENTS

2012/0054811 A1*  3/2012  Spears .......................... 725/106

* cited by examiner

*Primary Examiner* — Belix M Ortiz Ditren
(74) *Attorney, Agent, or Firm* — Krishnendu Gupta; Deepika Bhayana

(57) ABSTRACT

A method is used in managing analysis of activity data. Activity data is analyzed for a security investigation by using a content bundle. The content bundle specifies a set of actions. The set of actions are performed based on a set of inputs provided to the content bundle. Results of analysis of the activity data is provided in a format based on a set of outputs configured for the content bundle.

20 Claims, 8 Drawing Sheets

LOG QUERY - REPORT DEFINITION B

| EVENT TIME | SOURCE IP ADDRESS | USERNAME | SESSION ID | ACTION |
|---|---|---|---|---|
| 12/10/2010 8:41AM | 10.187.99.22 | cisco | 448 | access-list 1 permit host 10.188.99.22 |
| 12/10/2010 8:41AM | 10.187.99.22 | cisco | 448 | no access-list 10 deny all |

MANAGING ANALYSIS OF ACTIVITY DATA

BACKGROUND

1. Technical Field

This application relates to managing analysis of activity data.

2. Description of Related Art

Not long ago, people communicated important information between one another through the physical delivery of paper. Delivering documents in this way to convey important information once dominated business but has since been largely displaced by electronic delivery and communication. Whether it is by email or otherwise, today people send many sensitive and important documents and information electronically. The movement to electronic distribution of information has increased businesses' awareness of security issues. Electronic files are easy to copy and transmit out of an unwitting organization. Potential saboteurs like hackers, for example, can access, steal, alter, and/or destroy important information.

This increased awareness in security issues concerning electronic communications led companies to begin to monitor data transfers between entities, such as people, computers, and resources. The enormous volume of data generated by communications between entities (e.g., people viewing websites, people sending emails to one another, people transferring files to one another, and many other communications) made it difficult for a company to monitor all of the communication information. To help alleviate this problem, companies developed systems that analyze communications to determine which communications are likely illegal or otherwise prohibited by the companies' business rules.

In addition, because of the many ways to communicate over a network and the many different analysis tools needed to perform network forensics, the conventional method makes it difficult to answer even simple questions such as "What is happening on my network?," "Who is talking to whom?," and "What resources are being accessed?" It is difficult because there is no limit as to which applications one can use. Each application introduced onto a network brings new protocols and new analytical tools to audit those applications. For example, there are many ways to send a file to another person using a network: E-mailing the document as an attachment using the SMTP protocol; transmitting the file using an Instant Messenger; uploading the file to a shared file server using the FTP protocol; web sharing the document using the HTTP protocol; or uploading the file directly using an intranet protocol like SMB or CIFS. All of these protocols are implemented differently and special analysis tools are required to interpret them; a complex and expensive system.

Thus, computer hacking, and other computer related mischief undertaken or caused by people with either benign or malicious intent is of grave concern to businesses, particularly those that rely on expansive computer networks. Indeed, a breach of an organization's network, including even a single computer on that network, may result in direct and indirect financial loss, the latter including loss associated with costs such as legal fees, and fines.

The consistent demand for computer and other network services has increased the need for better network security tools. A variety of techniques have been deployed to shield networks from hacking and other intrusions. Those protective techniques may be categorized as either risk avoidance systems or risk management systems.

Risk avoidance techniques involve introducing a barrier to prevent inappropriate entry into a network. Such systems place reliance on keeping intruders out of the network entirely, rather than monitoring inappropriate network traffic after logging in. Risk avoidance systems include dedicated network firewalls and mandatory encryption over the network.

Risk management approaches, in contrast, adopt the philosophy that a network can not keep everyone out, and so rely upon detection of intrusive activity after logging in. A risk management approach uses auditing products that employ so-called sniffer technology to monitor network traffic. Data streams collected by such products look for specific types of network traffic by, for example, detecting electronic mail uploads by monitoring port 25 for simple mail transfer protocol (SMTP) events. However, most networks carry a large amount of traffic and simple sniffer type tools do not help sift through the volume. Other drawbacks exist.

The conventional auditing and analysis systems also fail because they require training personnel to use the numerous analysis tools needed to investigate network communications having many different protocols. This training is expensive. In addition, network analysis continues to become increasingly difficult due to the large number of new applications and protocols being introduced every year. Specific analytical tools must be developed for each collection system making it difficult to cross-correlate events and perform analysis.

Further, security practitioners often have to perform long and tedious tasks in order to complete an investigation indicating a possible security breach. These investigations involve a large number of repeatable manual steps that are laborious to perform.

There is accordingly a need to provide more comprehensive methods and systems that can provide users such as security practitioners and computer network managers the ability to have confidence that security risks are being effectively detected and analyzed.

SUMMARY OF THE INVENTION

A method is used in managing analysis of activity data. Activity data is analyzed for a security investigation by using a content bundle. The content bundle specifies a set of actions. The set of actions are performed based on a set of inputs provided to the content bundle. Results of analysis of the activity data is provided in a format based on a set of outputs configured for the content bundle.

BRIEF DESCRIPTION OF THE DRAWINGS

Features and advantages of the present invention will become more apparent from the following detailed description of exemplary embodiments thereof taken in conjunction with the accompanying drawings in which:

FIGS. 6-7 are example implementations of the current technique in which a user is provided with a result set of a query using a user interface.

DETAILED DESCRIPTION OF EMBODIMENT(S)

Figure 1:
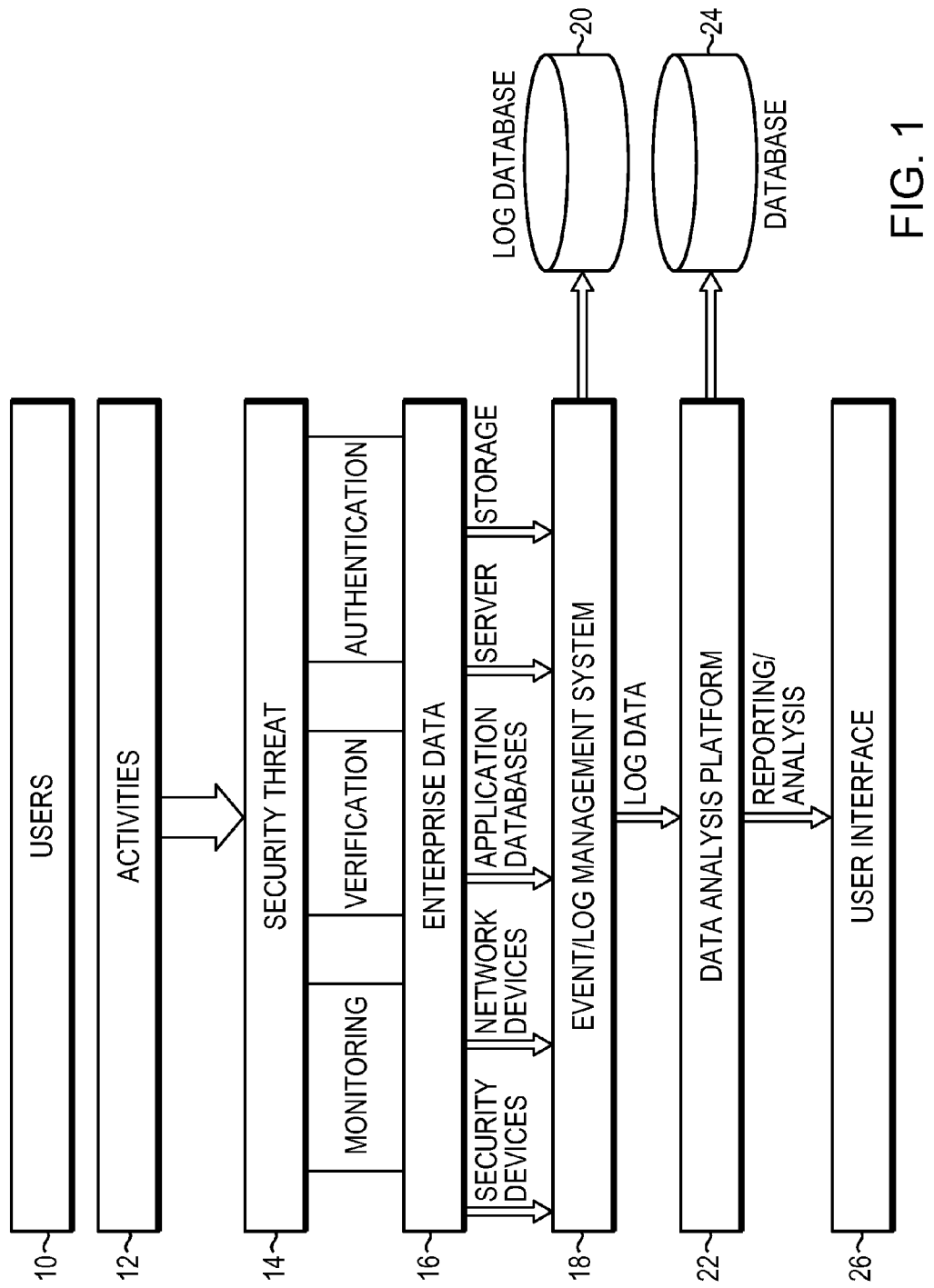
FIG. 1 is an example of an embodiment of a computer system that may utilize the techniques described herein.

Described below is a technique for use in managing analysis of activity data, which technique may be used to provide, among other things analyzing activity data for a security investigation by using a content bundle, performing a set of actions specified by the content bundle based on a set of inputs provided to the content bundle and providing results of analysis of the activity data in a format based on a set of outputs configured for the content bundle.

In a conventional system, a security tool analyzes data for investigating a security risk based on a pre-defined set of criteria that may not be changed by a user. Further, in such a conventional system, a user may not be able to configure a security tool to perform a set of actions that may change based on a security risk that is being investigated by the security tool. As a result, in such a conventional system, a security tool only performs a fixed set of pre-defined operations that the security tool has been designed for. For example, in such a conventional system, in order to determine who may access a shared administrative account on a specific system during a specified period of time, a security practitioner may perform any one of the following mechanism described below herein. In such a conventional system, a first mechanism that may be used by the security practitioner includes generating a set of reports and manually analyzing the set of reports based on an IP address of the specific system, the specific period of time, and IP addresses of identity sources (e.g. Microsoft® Active Directory systems) that may provide user names associated with the IP address of the specific system. Alternatively, in such a conventional system, a second mechanism that may be used by the security practitioner includes creating a script using a scripting program such that the script analyzes a set of logs generated by the specific system. However, in such a conventional case, creating the script may require a huge amount of time, the script may not be able to execute on a real time data thereby creating a copy of the set of logs for the analysis, and the security practitioner may not be able to reuse the script when performing a similar security investigation. Further, alternatively, in such a conventional case, a third mechanism that may be used by the security practitioner includes creating an application that includes creating a set of interfaces using a programming language for accessing and analyzing data. However, in such a conventional case, even though the application may be reused when performing a similar security investigation, the security practitioner may require a large amount of time to develop such application. Alternatively, in such a conventional case, a fourth mechanism that may be used by the security practitioner includes using a visualization technique to analyze and understand access patterns from logs and data generated by the specific system. However, in such a conventional case, the visualization technique may not provide a definitive answer indicating an identify of a user that may result into a security risk.

By contrast, in at least some implementations in accordance with the current technique as described herein, using a content bundle (e.g. XML script) that may be customized, updated and integrated with other content bundles allows a security practitioner to analyze activity data for a security investigation efficiently. In at least some embodiments of the current technique, a security practitioner may assign a set of inputs, a set of actions and a set of outputs to a content bundle for analyzing activity data such that the content bundle may be reused by changing the set of inputs (e.g. a different range of time, a different computer system) when performing another security investigation that may involve performing the same set of actions. Thus, in at least some implementations of the current technique, a content bundle specifies a set of actions that may be used repeatedly by a security practitioner in order to analyze data in a specific way that is relevant to a specific security investigation.

In at least some implementations in accordance with the technique as described herein, use of managing analysis of activity data can provide one or more of the following advantages: efficiently investigating a security risk by performing a set of actions in an automated fashion with a minimal amount of overhead, automating a security investigation by creating a reusable framework including content bundles, reducing or eliminating errors in analyzing activity data by providing an automated work flow for a set of actions, and reducing an amount of time required to analyze activity data by providing a framework to create new content bundles, use content bundles created by RSA, The Security Division of EMC, Bedford, Mass., and integrate content bundles created by a third party such as product partners, professional services, and other security practitioners.

Referring now to FIG. 1, shown is an example of an embodiment of a computer system that may be used in connection with performing the technique or techniques described herein. In FIG. 1, a system 30 represents a network environment whereby communication between two or more entities may be made or monitored. The network environment may be a simple network, for example, a cable connecting two computers. The network environment may be a complex network as well, such as representing a network configured to pass, allow passage of, or monitoring of communications between computers, servers, wireless computers, satellites, or other communication devices. For example, the network environment may represent intranets, extranets, and global networks including the Internet. A plurality of computers and servers may be connected to a data network such that activities 12 of users 10 operating the plurality of computers and servers are monitored. The data network may be a public network such as the Internet, or a private network, or combinations of the two. Further, the computers and servers may be geographically dispersed and selected computers and servers may be operated behind a firewall or one or more other devices, such as a gateway. Users 10 may include an administrator of a software executing on a system included in a data network. Additionally, users 10 may include a person using an application executing on a system included in a data network. Further, users 10 may also include a security practitioner investigating activities 12 of users in a system 30. Enterprise data 16 is collected for all activities 12 of users 10 of a network system 30. Enterprise data 16 may include information such as events, security alerts, and logs. Enterprise data 16 may be collected from systems such as security devices, network devices, applications used by users 10, databases used by users 10 or systems used by users 10, servers, and data storage systems. An event management system such as enVision® from RSA, The Security Division of EMC, Bedford, Mass. collects log information from network system 30, security applications, and storage environments. Some activities of users 10 may pose a security risk or threat 14. In order to investigate a security risk or threat 14, data collected by event management system 18 (also referred to as "log management system") is analyzed by a customized workflow such as a set of content bundles. Further, event management system 18 stores data collected from systems on a network in log data base 20 such that the log data base 20 may store data for a specific time period (e.g. in years).

In at least one embodiment of the current technique, data analysis platform 22 receives activity data from systems such as event management system 18 and analyzes the activity data. Further, data analysis platform 22 includes an engine and a parser such that the parser interprets a set of actions of a content bundle and the engine executes the set o actions in order to analyze activity data received from event management system 18. Further, data analysis platform 22 provides result of the analysis of the activity data in a format requested by a user via user interface 26. Moreover, data analysis platform 22 may store information generated during the analysis of the activity data in a data base 24.

Figure 2:
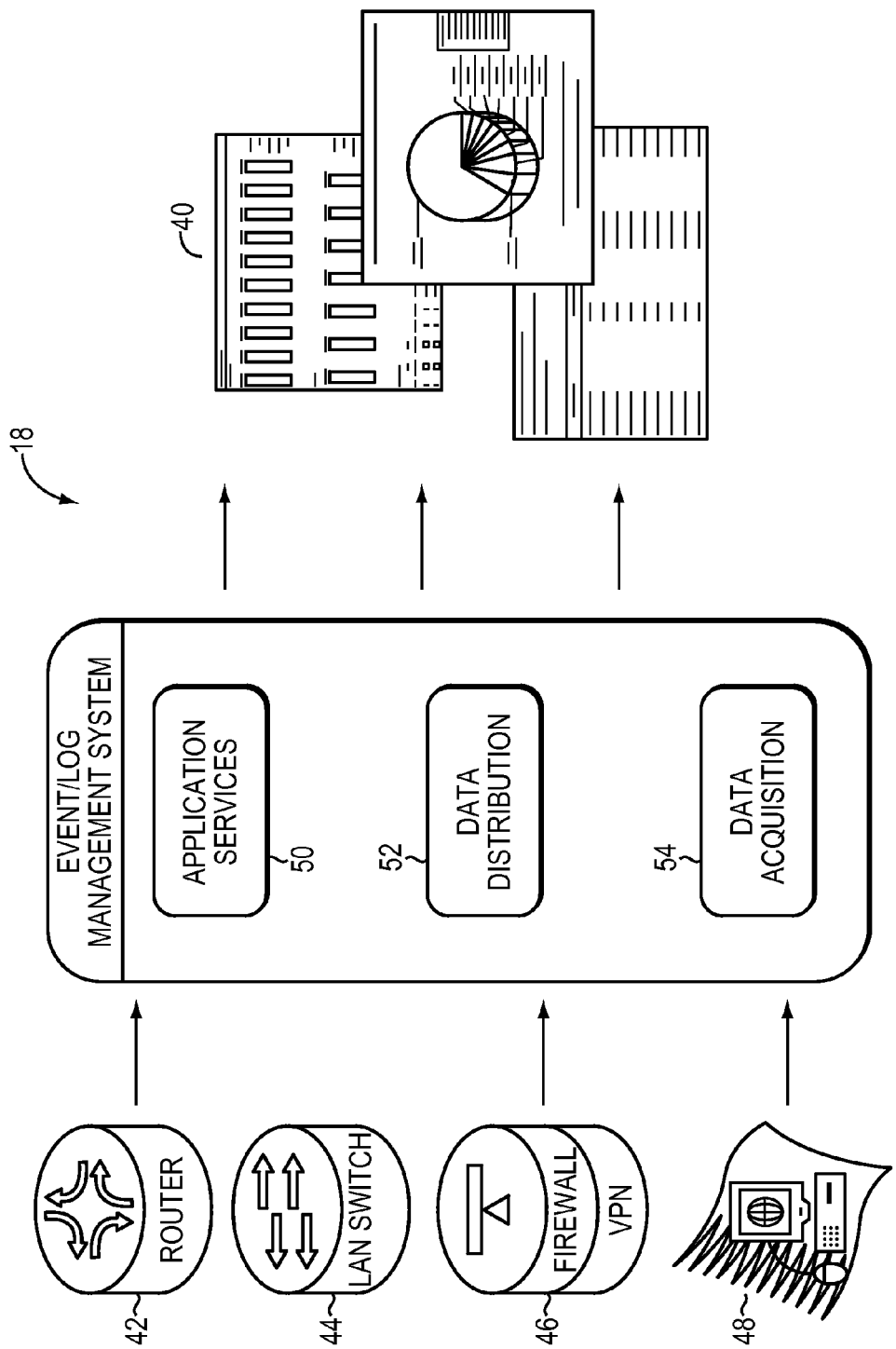
FIGS. 2-5 are more detailed representation of components that may be included in an embodiment using the techniques herein.

Referring to FIG. 2, shown is a more detailed representation of components that may be included in an embodiment using the techniques herein. FIG. 2 illustrates event management system 18 such as enVision® from RSA, The Security Division of EMC, Bedford, Mass. Event management system 18 such as enVision® includes a security information and event management application that collects and analyzes log information from a network environment, security systems, applications, operating and storage system environments. Event management system 18 such as enVision® includes a collection service 54 (also referred to as "data acquisition service") that captures events from network devices (e.g., router 42, Local Area Network (LAN) switch 44, firewall VPN 46, server 48), a data distribution service 52 that manages access and retrieval of the events captured by the collection service, and an application service 50 that provides an interactive user interface 40 to users and execute a set of tools for analyzing the captured events. The collection service 54 collects data from an enterprise network (e.g. IP) device, security exception events and information associated with operations performed by administrators. Thus, event management system 18 such as enVision® provides for collection of log data, analysis of the log data, and security alerts that enables organizations to simplify security compliance and quickly respond to high-risk security events. Further, event management system 18 such as enVision® collects and analyzes a large amount of data in real-time from one or more types of event sources. Additionally, event management system 18 such as enVision® provides customizable reports via user interface 40 indicating information associated with network activity, and real-time notifications of security events.

Thus, in at least one embodiment of the current technique, enVision® 18 may receive and collect information such as event information from devices that are being monitored and located on a local area network within an enterprise, asset information from devices that are being monitored and located on the local area network within the enterprise, information associated with remote events that are collected and forwarded from a remote location, known vulnerability signatures periodically received from intrusion detection and network scanning vendors, updates from a national vulnerability database (NVD) that provides a mapping between vulnerability signatures and descriptions of known vulnerabilities, requests from users for generating reports based on collected events and/or vulnerabilities, configuration data, asset information imported from a third-party asset management software, XML parsers, and information for describing new devices detected on a network. Further, in at least one embodiment of the current technique, enVision® 18 may generate reports including information such as security compliance reports based on regulatory standards, custom reports based on a request from a user, and notifications and alerts to users regarding events selected using a graphical user interface, an email, a message or any one of the other known communication mechanisms. Further, enVision® 18 may provide the reports to users using a graphical user interface and/or a command line interface.

Data acquisition service 54 provides capability for collecting events and information associated with security vulnerabilities from devices located on a network. Further, data acquisition service 54 provides support for communicating with yet unknown network devices by using a push, pull or an agent-based communication mechanism. The events and information collected by data acquisition service 54 are processed and stored in a compressed file format into a proprietary Internet Protocol Database (IPDB) file system. An IPDB is a proprietary file system that provides indexed access to event data. Additionally, information associated with security vulnerabilities is processed and stored in a database such that the information of the database is accessed by services executing on enVision® 18. Data distribution service 52 provides access to data stored in the IPDB file system. Application services 50 provides services such as reporting and vulnerability alerting services to users of enVision® 18. Further, application services 50 include a set of user interfaces that may include a browser-based event viewer, and a client based event explorer application. The set of user interfaces provides capability to view information, generate reports, and create a workflow for analyzing an incident report.

It should be noted that each of the services 50, 52, 54 described above herein and included in the event management system 18 may be configured based on any one of a variety of system architectures as may be provided and supported in accordance with a type of network used in system 30. Further, each of the services 50, 52, 54 described above herein and included in the event management system 18 may all be located at the same physical site, or, alternatively, may also be located in different physical locations. For example, in a single system configuration, application services 50, data distribution services 52, and data acquisition services 54 are all located on a same system. For example, in a multi-system configuration, application services 50, data distribution services 52, and data acquisition services 54 are each located on a separate system in order to create a distributed system. Thus, the multi-system configuration supports a large sized network and addition of one or more application services 50 and data acquisition services 54 to the multi-system configuration.

Figure 3:
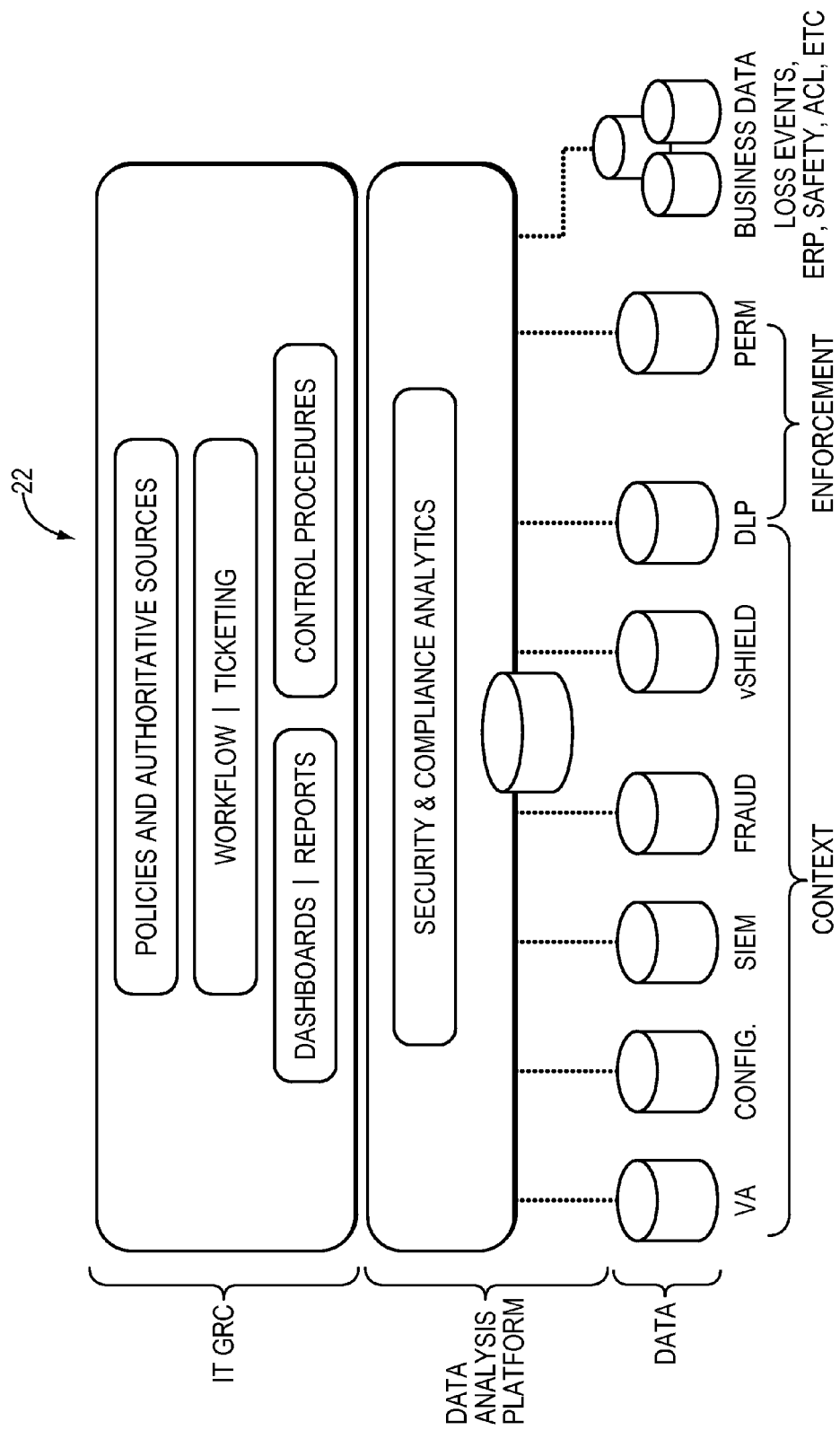

Referring to FIG. 3, shown is a more detailed representation of components that may be included in an embodiment using the techniques herein. Data analysis platform 22 is a security operations management system that integrates efficiently with a large number of data sources and analyzes activity data that is collected by the large number of data sources. Data analysis platform 22 receives data for analysis from data sources such as event management system 18 (e.g., enVision®), risk based content awareness system, databases (e.g. a massively parallel database), a virtual cloud infrastructure (e.g. VMware® Server virtual infrastructure software available from VMware, Inc., Palo Alto, Calif.), a data storage system, a backup storage system, and an Information Technology ("IT") governance, risk management and compliance system ("IT-GRC").

Figure 4:
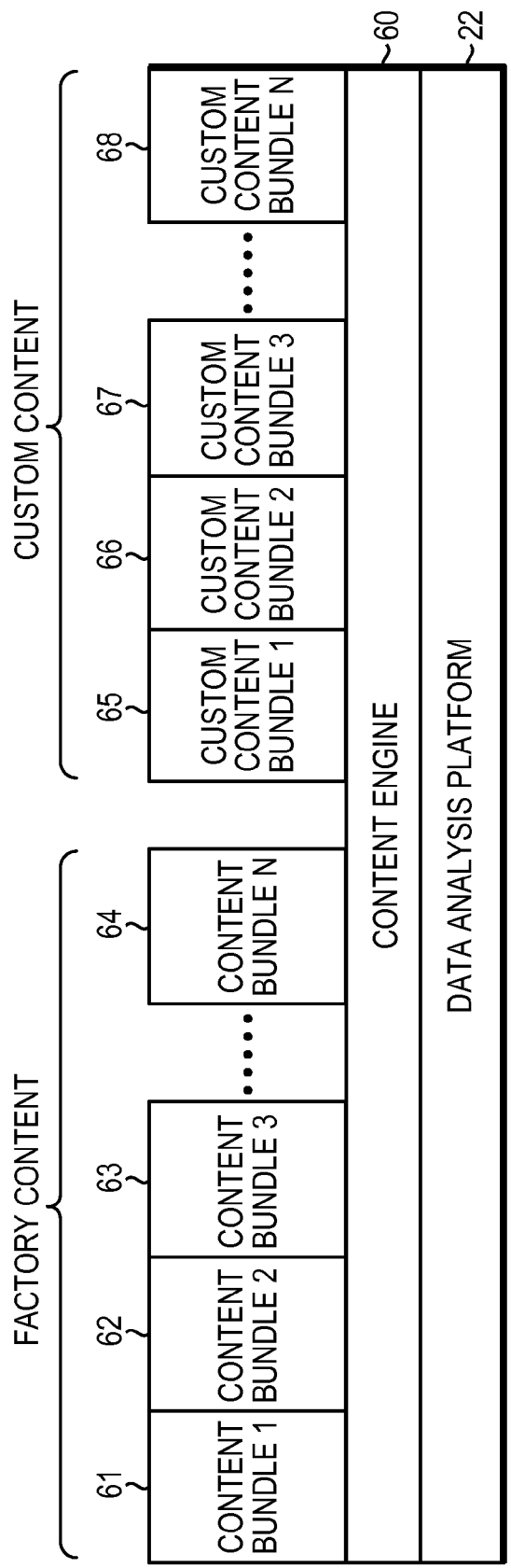

Referring to FIG. 4, shown is a more detailed representation of components that may be included in an embodiment using the techniques herein. In at least one embodiment of the current technique, data analysis platform 22 analyzes activity data using a content bundle. A content bundle may include a structured XML file that is parsed and executed by the data analysis platform 22. Content engine 60 includes a parser such as a XML parser that interprets a set of actions (also referred to as "commands") included in a content bundle in a platform independent way such that a change to a component of data analysis platform 22 does not require changing the content bundle. In at least one embodiment of the current technique, a content bundle describe a workflow that is illustrated by a set of actions included in the content bundle, a set of inputs provided to the content bundle, and a set of outputs configured for the content bundle. Further, each action of the set of actions of the content bundle invokes an operation on data analysis platform 22. Further, a set of actions may be stored in a XML file that includes a structure such that the XML file may repeatedly be executed. Further, a XML file representing a set of actions may include documentation describing a method for creating a new content bundle. In at least one embodiment of the current technique, a content bundle may include a factory content bundle (e.g. content bundle1-N 61-64) that are created by RSA, The Security Division of EMC, Bedford, Mass. and provided to a third party, customer and user using security system available from RSA, The Security Division of EMC, Bedford, Mass. Further, a content bundle may include a custom content bundle (e.g. custom content bundle1-N 65-68) that are created by a customer using security system available from RSA, The Security Division of EMC, Bedford, Mass., and is not readily available to other customers of security system available from RSA, The Security Division of EMC, Bedford, Mass.

The data analysis platform 22 manages a factory content bundle in such a way that the factor bundle can not be modified by a user of a system that includes data analysis platform 22. Further, a factory content bundle may only be added or modified by a manufacturer of a system that includes data analysis platform 22 or an entity that initializes the data analysis platform 22. However, a user may create a copy of a factory content bundle and modify the copy to create a new custom content bundle. Further, data analysis platform 22 allows a user to add or delete a custom content bundle.

In at least one embodiment of the current technique, a content bundle includes a unique identifier that allows the data analysis platform 22 to track the content bundle. Further, a custom content bundle includes a specific naming structure such that a unique identifier of a custom content bundle may be differentiated from a unique identifier of a factory content bundle.

Figure 5:
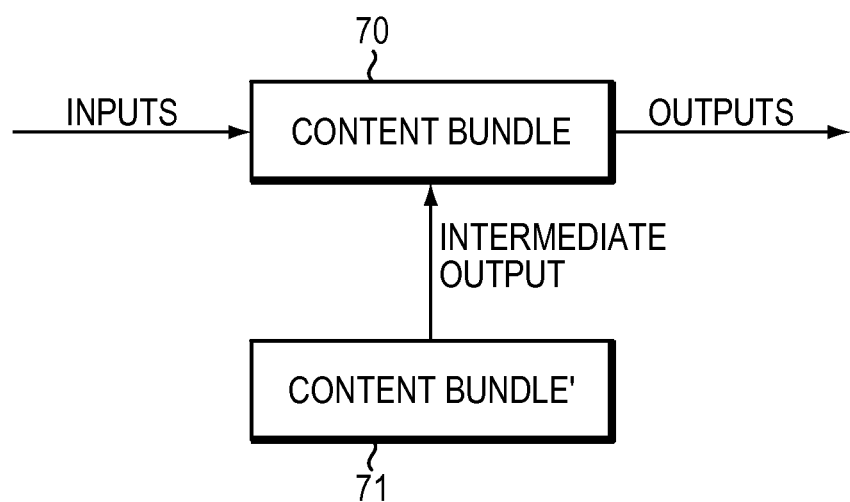

Referring to FIG. 5, shown is a more detailed representation of components that may be included in an embodiment using the techniques herein. In at least one embodiment of the current technique, a set of inputs are provided to content bundle 70. Further, content bundle 70 may receive output of other content bundles (e.g., content bundle' 71) as an input to the content bundle 70. Further, a content bundle generates analysis of activity data in a format that is based on a set of outputs configured for the content bundle.

In at least one embodiment of the current technique, a content bundle includes metadata that describes the content bundle such that the metadata enables a user interface of data analysis platform 22 to identify and categorize the content bundle. The metadata of a content bundle is not part of a workflow that is represented by a set of actions included in the content bundle. Instead, the metadata of a content bundle helps manage the content bundle. The metadata of a content bundle includes information such as a display name for the content bundle, a unique identifier for the content bundle, a version identifier for the content bundle, a category and a subcategory for the content bundle such that the content bundle may be categorized, key words that may be used to search and access the content bundle, a short description of the content bundle that may be used to describe functionality of the content bundle, and programmatic description of sets of inputs and outputs associated with the content bundle that may be used to integrate the content bundle with other content bundles. It should be noted that the metadata of a content bundle as described above herein may either be included in the content bundle or stored separately from the content bundle.

In at least one embodiment of the current technique, a content bundle may be configured in such a way that a user of the content bundle may create a set of text boxes that may be displayed in a graphical user interface of data analysis platform 22 for providing information (e.g., how to use a content bundle) to users. Further, a content bundle may be configured in such a way that the content bundle indicates a method that may be used for receiving a set of inputs from a user. A user may provide a set of inputs to a content bundle using any one of the following mechanism described below. A first mechanism that is used to provide a set of inputs to a content bundle includes using a web interface in such a way that a user manually enter information using a graphical interface (e.g., a text box, a diary box) displayed on the web interface. The set of inputs may include information such as an integer representing a number of days prior to a present day for searching a list of content bundles, a time frame indicated by a start time and an end time, and a string value that may include a wildcard character.

A second mechanism that is used to provide a set of inputs to a content bundle includes selecting an option from a list of options provided using a drop down menu displayed on a graphical user interface of data analysis platform 22. The set of inputs may include information such as a set of parameters configured for the content bundle, a list of variables selected from a data model, and a pre-defined list of options.

A third mechanism that is used to provide a set of inputs to a content bundle includes providing a set of data included in a file as the set of inputs. A file that is used to provide a set of inputs may store data in a format such as a XML format, a comma-separated values (CSV) format. Further, data analysis platform 22 may include a service that uploads a file as a user input and provides the file to a content bundle. Further, data analysis platform 22 may include a method for validating a set of inputs provided to a content bundle using any one of the mechanism described above herein. Additionally, data analysis platform 22 may include a method for providing a feedback to a user regarding issues encountered when validating a set of inputs.

In at least one embodiment of the current technique, an access control may be applied to a content bundle such that the content bundle may be restricted for use by a specific user and follows a Role Based Access Control (RBAC) model that is provided by the data analysis platform 22. Further, a content bundle may include a Structured Query Language ("SQL") query or Multidimensional Expression ("MDX") query that may gather information from a database or data warehouse. SQL is a standard language for accessing databases and MDX is a language that enables a user to describe multidimensional queries.

In at least one embodiment of the current technique, a content bundle may include information that describes a format for providing output data to a user. The format for providing output data to a user may include a list, pie chart, line chart with horizontal and vertical alignments, pareto chart, radar chart, bar chart with horizontal and vertical alignments, or stack chart. Further the information may also include a secondary format that is used for providing output data to a user such that the secondary format may include a graphical or text based heat map, an entity relationship diagram, a Venn diagram, a timeline diagram.

Further, in at least one embodiment of the current technique, a content bundle includes information that describes how output data is provided to a user of the content bundle. A content bundle may be preconfigured to describe how output data is provided to a user of the content bundle. Alternatively, a user may specify how out put data of a content bundle is provided to a user when executing the content bundle. Output data of a content bundle may be provided as an input to other content bundles by creating a result set and providing the result set to another content bundle as an input. Output data of a content bundle may be provided to a user as a formatted file such as comma separated values (CSV) file, XML file, PDF file, or HTML file. Further, output data of a content bundle may be provided to a user by emailing the output data or a link of the output data to the user.

In at least one embodiment of the current technique, output data of a content bundle is displayed to a user via a graphical user interface of data analysis platform 22. The output data may include one or more elements such that an element indicates information included in the output data. A content bundle may be configured in such a way such that an action is performed or a function is invoked when a user clicks on an element of output data using a graphical user interface. For example, an action is performed to provide additional detailed information regarding an element of output data when a user clicks on the element of the output data displayed using a chart. For example, an action is performed to create a new chart based on information derived from an element of output data when a user clicks on the element of the output data displayed using a chart. For example, an action is performed to execute a second content bundle using information of an element of output data as an input to the second content bundle when a user clicks on the element of the output data. For example, a new set of actions may be performed when a user clicks on an element of output data displayed to a user. Further, in at least one embodiment of the current technique, data analysis platform 22 provides an ability to schedule execution of a content bundle at a predetermined time.

In at least one embodiment of the current technique, data analysis platform 22 implements functionality for a set of methods (also referred to as "function") such that a content bundle may invoke a method from the set of methods on data analysis platform 22. Further, each method of the set of methods may be invoked as an individual method or as part of a group of methods. The set of methods supported by data analysis platform 22 includes a domain information look up function that accepts input data that may include information such as a domain, and provides output data that may include information such as a name of an entity that owns the domain name, contact information, host agent for the domain, date on which the domain was established, and date on which the domain was last updated. Further, the set of methods may include a geographical location look-up function that allows a content bundle to find geographical location information corresponding to an IP address. Geographical location information may be stored in a database that may be updated at a regular time interval. Further, the set of methods may include a result comparison function that compares two or more sets of output data that is generated either using SQL and MDX queries or performing a set of actions provided to a content bundle as an input. Further, the set of methods may include a state timeline lookup function that allows a content bundle to determine a state of a particular object or device at a specific time. Further, the set of methods may include a user name lookup function that allows a content bundle to determine information associated with a user name. The user name lookup function accepts input data that may include information such as a user name of a user, a type of an identity source, an address or unique identifier for the identity source. The user name lookup function provides output data that may include information such as a full name associated with the user name. Further, data analysis platform 22 may use a secure communication channel in order to ensure that data communications are secure. Further, the set of methods may include a fetch function that allows a content bundle to send a request to the data analysis platform 22 to fetch a specific file from a remote location or issue a database query from a remote database using any one of the methods (e.g., FTP, FTPS, HTTP, HTTPS, SFTP, SCP, and ODBC/JDBC). Further, data analysis platform 22 provides a lock box for storing credentials provided by a user. The lock box may be pre-populated with information or information may be provided at the time of execution of a method. If validation fails when using credentials stored in the lock box, a user is prompted to provide valid credentials. The credentials provided by the user may be saved in the lock box to replace credentials already stored in the lock box. The set of methods may include a query construction function that allows a content bundle to provide a user interface to a user for creating a SQL or MDX query by using the user interface. The user interface provided to a user enables the user to create a query (SQL/MDX) in such a way that even when the user does not possess a knowledge of how to create a query, the user may easily create the query for retrieving information from a database. The user interface provides a list of variables of a data model such that the user may select elements from the data model for creating the query. Further, the user interface enables the user to add one or more constraints for the query. As a result, the query construction function generates a formatted SQL or MDX query thereby enabling the user to execute the formatted query on data analysis platform 22.

In at least one embodiment of the current technique, a content installer includes an interface that allows a user to select a content bundle that may be installed or updated on a system such as data analysis platform 22. The content installer adds a content bundle selected for installation in a table stored on a database that is accessed by data analysis platform 22. Content bundles installed on the data analysis platform 22 are displayed on a user interface of data analysis platform 22 such that the content bundles are organized in groups based on a category and sub-category of each content bundle. As a result, a user may easily browse the content bundles or search a content bundle from the content bundles efficiently. Further, a content bundle may be configured to analyze internationalized data that uses multi-byte characters.

In at least one embodiment of the current technique, a content bundle generates output data based on analysis of activity data such that the output data may include one or more sets of result data. A set of result data may consume a large amount of storage space thereby impacting performance of data analysis platform 22. Thus, a content bundle includes a configurable time limit that indicates how long a set of result data that is generated by the content bundle may be stored in a database of data analysis platform 22. After the configurable time limit of a content bundle expires, a set of result data generated stored in the database is removed from the database. For example, a content bundle may include a default time limit of 24 hours which may be increased or decreased to a different value by a user.

With reference also to FIG. 4, in at least one embodiment of the current technique, content engine 60 may function as a content abstraction layer that provides functionality to a content bundle such that the content bundle may perform a set of actions on data analysis platform 22. Content engine 60 process a set of actions included in a content bundle in an ordered arrangement such as a sequential order. Further, if content engine 60 encounters an error processing a user input as an input data for an action of a set of actions included in a content bundle, data analysis engine 22 provides a description of the error to the user such that the description includes information regarding invalidity of the user input. For example, if a valid user input is a value between number one and ten and a user provides a number with a value of twenty as an input, data analysis platform 22 provides an error to the user indicating that the user need to provide a value between number one and ten as an input. A content bundle includes information regarding a valid value range that may be used as a user input for the content bundle which is then used by content engine 60 for processing the user input. Further, content engine 60 provides an ability for validating a set of actions included in a content bundle in order to ensure that a set of inputs received from a user for the content bundle does not pose a security risk to data analysis platform 22. Further, content engine 60 process a set of inputs (such as a number of arguments) when executing a set of action included in a content bundle.

An example embodiment of the managing analysis of activity data technique is now described. Content engine 60 provides a mechanism for performing one or more activities (also referred to as actions) that are described herein. An activity may provide one or more functionalities as described below herein.

An activity may include a set of actions (e.g., function calls) that provide a functionality to retrieve information regarding metadata of a content bundle. The set of actions may include following functions as described below herein.

DisplayName(string)—parameter "string" indicates a display name for a content bundle such that the display name is displayed in a user interface of data analysis platform 22.

Version(float)—parameter "float" indicates a version number of a structuring language such as XML that is used for creating a content bundle.

GUID(int)—parameter "int" indicates a unique integer identification value for a content bundle. However, new versions of the content bundle shares the unique integer value as an identifier.

Category(string, string, string . . . )—parameter "string" indicates a category or a sub-category for a content bundle. The function call "category" may include one or more parameters such that each parameter indicates a successive sub-category when the parameters are processed in an ordered arrangement. For example, functional call "category(Network, Malware)" indicates that a content bundle belongs to "Network" category and "Malware" sub-category.

Keyword(string, string, string . . . )—parameter "string" indicates a keyword that is used to help a user for searching a specific content bundle that includes the keyword. The function call "Keyword" may accept one or more parameters as input data.

Description(string)—parameter "string" indicates description of a content bundle such that the description may be used in providing an online help user interface to a user.

Inputs(var, var, var, . . . )—the function call "inputs" provide a set of inputs to a content bundle in an ordered arrangement. Boolean operators such as "&" and "|" are used to combine two or more inputs (e.g., Inputs(string, int, string&int|string&int)). Parameter "var" may be a string value, an integer value, a wildcard (represented by "*" character) or any one of the other variables supported by the data analysis platform 22. Further, the function call "inputs" may accept output data of a first content bundle as a set of inputs for a second content bundle. In such a case, a mapping is created to map the output data of the second content bundle to the set of inputs for the first content bundle. The mapping may be provided using a user interface or XML file.

Outputs(var, var, var, . . . )—The function call "outputs" provides output data such as a set of outputs for a content bundle in an ordered arrangement. Parameter "var" may be a string value, an integer value, a float value, a list, an array or any one of the variables supported by data analysis platform 22. A set of outputs for a first content bundle provided by the function call "outputs" may be provided as a set of inputs to a second content bundle.

Further, an activity may include a set of actions (e.g., function calls) that provide a functionality for displaying textual information for a content bundle. The set of actions may include following functions as described below herein.

TextWindow(string)—parameter "string" indicates a text window that displays information such as an input requested from a user via a graphical user interface, a rendering method that describes a format for displaying output data of a content bundle, and an output for the content bundle. The content engine 60 assumes that a text window is referring to an activity that is invoked immediately prior to the invocation of the functional call "textwindow".

Further, an activity may include a set of actions (e.g., function calls) that provide a functionality for a content bundle. The set of actions may include following functions as described below herein.

InputKeyed(var1,var2,var3)—parameter "var1" indicates a type of variable that may be provided as an input to a content bundle. The type of an input may be a string value, an integer value, a wildcard value (represented with "*" character), series of values or strings separated by a delimiter, or any one of the variables supported by the data analysis platform 22. Parameter "var2" and "var3" may indicate the minimum and maximum expected values respectively.

InputTimeGraphical(var1,var2)—allows a content bundle to accept an input from a graphical user interface of the data analysis platform 22. Parameter "var1" indicates a start time and parameter "var2" indicates an end time.

InputMenu(SQL/MDX Query/Query Reference, int)—parameter "SQL", "MDX Query" or "Query Reference" indicate a query that includes a list, and "int" indicates the maximum number of elements in the list. However, parameter "int" may be provided optionally. For example, "InputMenu ([SQL],10)" indicates that parameter "[SQL]" describes a specific SQL query which is provided as an input and executed by a content bundle. Similarly, for example, "Input (SQL1,10)" indicates that parameter "SQL1" describes a query that has been executed previously and assigned an integer value of one.

An activity may include a set of actions (e.g., function calls) that provide a functionality for selecting one or more input from a set of inputs provided by a user for a content bundle. Two or more inputs may be combined by using a boolean operator (e.g., "and", "or"). For example, if an input may be indicated by a time value that is described in minutes or seconds, the boolean operator "or" is used to combine two or more input values. For example, if a user name and an asset name is provided as inputs to a query, the boolean operator "and" is used to combine two or more input values. Content engine 60 processes two or more inputs that are combined using a boolean operator as a single combined input. Further, the following is pseudo code for an example implementation of a query {
InputKeyed(string)
AND
InputKeyed(int,1,10)
OR
InputMenu(var1,var2)

AND
InputKeyed(int,1,10)
}
TextWindow(string)

An example described above herein allows a user to either provide two values as inputs using a user interface or select two input values from options provided by a menu as inputs.

Further, an activity may include a set of actions (e.g., function calls) that provide a functionality for indicating a query for a content bundle. The set of actions may include following functions as described below herein.

SQL(SQL Query, int)—parameter "SQL Query" indicates an actual SQL query that is executed on data analysis platform 22 and parameter "int" indicates an integer value that refers to a specific output provided by the SQL query (also referred to as a query reference).

MDX(MDX Query, int)—parameter "MDX Query" indicates an actual MDX query that is executed on data analysis platform 22 and parameter "int" indicates an integer value that refers to a specific output provided by the MDX query (also referred to as a query reference).

Further, an activity may include a set of actions (e.g., function calls) that provide a functionality for describing a rendering method for a content bundle that is used for providing output data in a specific format. The set of actions may include following functions as described below herein.

RenderList(SQL/MDX Query/Query Reference, int)—parameter "SQL/MDX Query/Query Reference" indicates a query that is used to create output data (such as a list of result data set) and parameter "int" indicates the maximum number of elements in the list of result data set. However, parameter "int" may be provided optionally. Further, a number of elements in the list is based on a number of columns in the query.

RenderPie(SQL/MDX Query/Query Reference1, SQL/MDX Query/Query Reference2, int)—parameter "SQL/MDX Query/Query Reference1" indicates a query used to create pie slices of a pie chart, parameter "SQL/MDX Query/Query Reference2" indicates labels for the pie chart, and parameter "int" indicates the maximum number of elements in the pie chart. Further, parameter "int" may be provided optionally.

RenderLine(SQL/MDX Query/Query Reference, var1, var2, var3, var4, string1, string2, string3, string4)—parameter "SQL/MDX Query/Query Reference" indicates a query that is used to determine horizontal axis and vertical axis for a chart. Parameters "var1" to "var4" indicate the minimum and maximum values for horizontal axis and vertical axis respectively. Further, the minimum and maximum values may be configured automatically by a user interface. Parameters "string1" and "string2" indicate labels for horizontal ("x") axis and vertical("y") axis of the chart respectively. Parameters "string3" and "string4" indicate whether the chart is displayed as a linear chart or logarithmic chart along respective horizontal axis and vertical axis. The following is an example implementation of a query.

RenderLine([SQL], 0, auto, 0, auto, Time, U.S. Dollars, linear, log).

RenderBar(SQL/MDX Query/Query Reference, var1, var2, var3, var4, string1, string2, string3, string4)—parameter "SQL/MDX Query/Query Reference" indicates a query used for determining horizontal("x") axis and vertical("y") axis for a chart. Parameters "var1" to "var4" indicate the minimum and maximum values for the horizontal("x") axis and vertical("y") axis respectively. The minimum and maximum values may be set to "auto" indicating that a user interface determines these values. Parameters "string1" and "string2" indicate labels for the horizontal("x") axis and vertical("y") axis respectively. Parameter "string3" and "string4" indicate whether the chart is displayed as a linear chart or logarithmic chart along respective horizontal axis and vertical axis. Alternatively, parameters "string3" and "string4" may include the value "auto" indicating that a user interface makes a determination. The following is an example implementation of a query. Function call "RenderBar([SQL], 0, auto, 0, auto, Time, U.S. Dollars, linear, log) indicates that a bar chart is rendered from a SQL query indicated by parameter "[SQL]" with horizontal and vertical axis values starting from value "0" to a value determined by a user interface based on data displayed on the horizontal axis which is labeled as "Time", and on the vertical axis which is labeled as "U.S. Dollars". The horizontal axis is displayed as a linear chart and the vertical axis as a logarithmic chart.

RenderMap(SQL/MDX Query/Query Reference, int)—parameter "SQL/MDX Query/Query Reference" indicates a query that provides co-ordinates for a map that is produced by this function call, and parameter "int" indicates a unique (e.g., GUID) reference for the map that is used as a backdrop for the map.

Further, an activity may include a set of actions (e.g., function calls) that provide a functionality for describing an element action instruction for a content bundle. The set of actions may include following functions as described below herein.

ElementAction(string1,string2)—parameter "string1" may include values such as "command", "output", and "branch". The value "command" executes an action of a set of actions included in a content bundle such that the set of actions may be described in a XML file. The action is executed using input data provided as an input to the content bundle. The value "output" provides an element of output data of a first content bundle to a second content bundle as an input value. The value "branch" executes a set of commands that are encapsulated in parentheses in a function call. Parameter "string2" indicates a reference variable that is used for data indicated by a selected element which is referenced in a SQL (or MDX) query. The function call "ElementAction" is invoked immediately after execution of a rendering function call associated with this function call "ElementAction". The following is an example implementation of a query.

{
RenderPie([SQL1], [SQL2], 10)
TextWindow("Top Ten Bandwidth Consumers")
ElementAction(Command, EA)
RenderList(EA, 50)
}
{
RenderPie([SQL1], [SQL2], 10)
TextWindow("Top Ten Bandwidth Consumers")
ElementAction(Output, EA)
}

In this example query as described above herein, output data is displayed to a user via a menu on a user interface such that the user may select a new content bundle and one or more elements of the output data as input data for the new content bundle.

Further, an activity may include a set of actions (e.g., function calls) that provide a functionality for describing an output instruction for a content bundle. The set of actions may include following functions as described below herein.

Export(SQL/MDX Query/Query Reference, string1, string2)—parameter "SQL/MDX Query/Query Reference" indicates a query such that results of the query are exported based on parameters provided to the function call "Export". Parameter "string1" indicates a name for a file to which the results may be exported. The name of the file is automatically updated to include information such as a date in order to ensure that identical file names provided by a user may not result in a collision error. Parameter "string1" may be provided by the user during execution of this function call. This function call may be combined with a text window function call in order to provide description of a parameter. Parameter "string2" indicates a file type such as CSV, XML, PDF, and HTML.

EmailExport(SQL/MDX Query/Query Reference, string1, string2, int, string3, string4)—this functional call is similar to the functional call "Export". However, this function call allows a user to email results of a query to a specific target. Parameter "int" indicates the maximum size (e.g. megabytes (MB)) for the email which helps to prevent the user from accidentally emailing a large file. Parameter "string3" indicates a menu input option that allows the user to determine whether an output may need to be encrypted using security keys available as part of a global address list. The menu input option may include values such as "yes" and "no". Parameter "string4" indicates a list of email addresses for target users that may receive the email file.

A set of example use cases below describes use of a content bundle based on the current technique. With respect to the set of example use cases, in all example use cases below, Steve Abate (referred to as "Steve") is referred to as a security analyst, Jim Calhoun (referred to as "Calhoun") is referred to as a security architect, Vicky DiMarco (referred to as "Vicky") is referred to as a security engineer, Jim Rosenthal (referred to as "Rosenthal") is referred to as a security manager, and Lou Costello (referred to as "Lou") is referred to as a system administrator.

For example, the first use case describes a scenario in which shared accounts are accessed. For example, in such a use case, Steve is assigned the task of determining which users on a network have access to a predetermined list of shared administrative accounts of a set of critical systems. A user utilizes an identity source such as an active directory system when the user access an account from a desktop by using a login process. However, some systems (e.g. routers, mainframes) may not integrate with an active directory system. Thus, a username and password for a shared administrative account may be shared with a user for a purpose that may not be related to business of an organization. Therefore, in order to avoid a security breach or risk, it is critical for Steve to ensure that only an authorized person may access a system using a shared administrative account. In at least one embodiment of the current technique, Steve may create a content bundle that includes the following set of actions. First, the content bundle performs an action that request Steve to upload a CSV file which includes a list of shared administrative accounts that Steve like to investigate for a possible security risk. The CSV file must include the following information for each shared administrative account that Steve may like to track. The information may include a username of an account, and a device type for a system such that log data is collected for that system. The information may optionally include an IP address of the system. Next, the content bundle performs an action that request Steve to provide a number of days as an input such that activity data may be analyzed for the number of days (e.g. analyze the last 90 days of access to a system). However, the content bundle may be pre-configured to include this information. Next, the content bundle executes a first SQL query that retrieves a list of IP addresses such that each IP address of the list of IP addresses indicates the IP address that has been logged into a system over a time period indicated by the number of days. The content bundle creates a first result set that includes information such as the list of IP addresses retrieved by the first SQL query. Next, the content bundle executes a second SQL query that retrieves information such as a hostname for a system or workstation associated with an IP address of the list of IP addresses. The second SQL query retrieves the information for each IP address of the list of IP addresses. Next, the content bundle performs a third SQL query that retrieves information from the active directory indicating information regarding users that logged in from a specific IP address or hostname. The content bundle creates a second result set that includes information retrieved by the third SQL query. Next, the content bundle executes a fourth SQL query that combines the first and second result sets, and creates a list of active directory users that logged in from IP addresses that are used for logging into a system under investigation. Next, the content bundle invokes a function call to deduplicate result sets to create a final result set. Lastly, the content bundle displays the final result set to a user (e.g., Steve) as a list on a user interface and enables the user to retrieve the result set in any one of the output format described above herein using an output instruction function call. As a result of execution of the content bundle, Steve is able to create a list of users that have access to the shared administrative accounts.

For example, the second use case describes a scenario in which a user investigates usage of shared accounts. For example, in such a use case, Alice Power of a network operations group notices that a configuration of a router has been altered. The configuration (e.g., remote access) of the router has been updated to enable all internal IP addresses to connect to the router. Prior to the update of the configuration, only a set of specific management IP addresses may connect to the router. Thus, Alice notifies Steve Abate of an information security group to begin a security investigation for a possible security risk indicated by a possible unauthorized configuration change of the router. Steve begins the security investigation by analyzing event logs of the router. Steve uses a content bundle such that the content bundle executes a first query against event logs of the router in order to collect a list of source IP addresses such that each IP address of the list of source IP addresses indicates an IP address of a remote login session such that the IP address invoked an enable command to change the configuration of the router.

Figure 6:
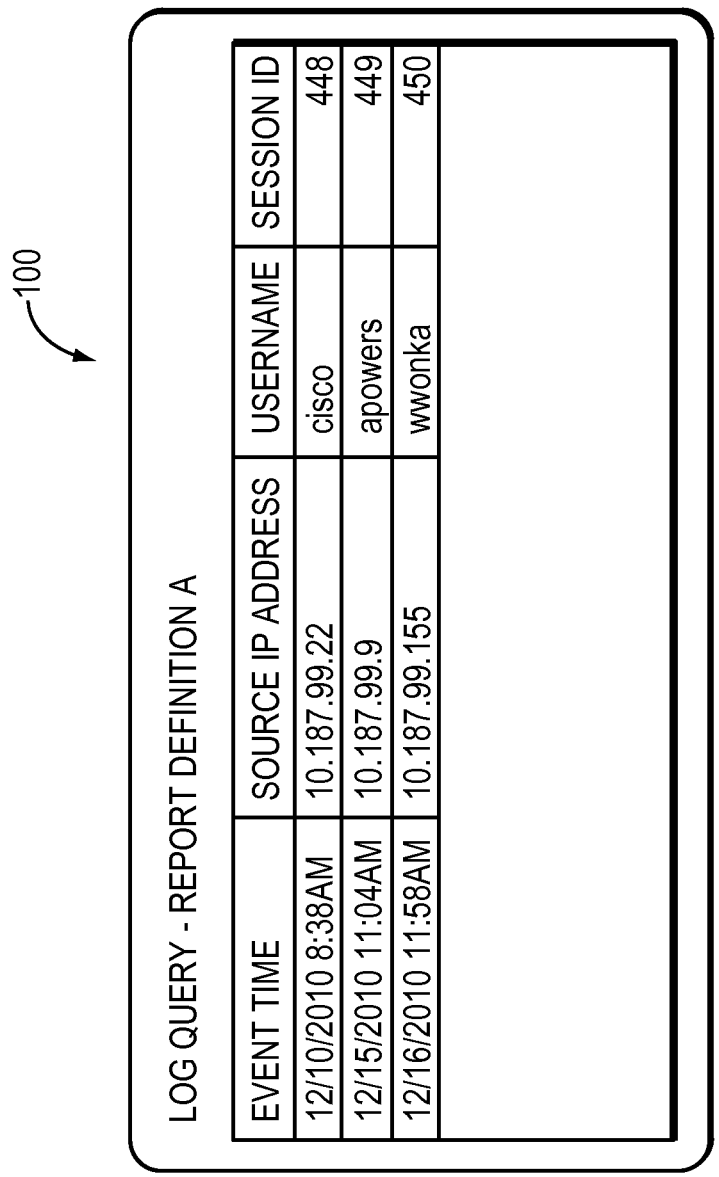

FIG. 6 illustrates an example implementation of the current technique in which a user is provided with a result set of a query using a user interface. With respect to the second use case, the user interface 100 includes information such as a session start time, a source IP address, a user name for a user that has logged into the router, and a session identification number.

FIG. 7 illustrates an example implementation of the current technique in which a user is provided with a result set of a query using a user interface. With respect to the second use case, the user interface 105 illustrates a result set of a second query executed by the content bundle. For each session included in the result set of the first query, the second query identifies whether a command (such as a "permit" or "deny" function) has been invoked during the session. For example, the second query retrieves information indicating that the user named "cisco" issued the command (e.g., "permit" and "deny") to change the configuration of the router.

Figure 8:
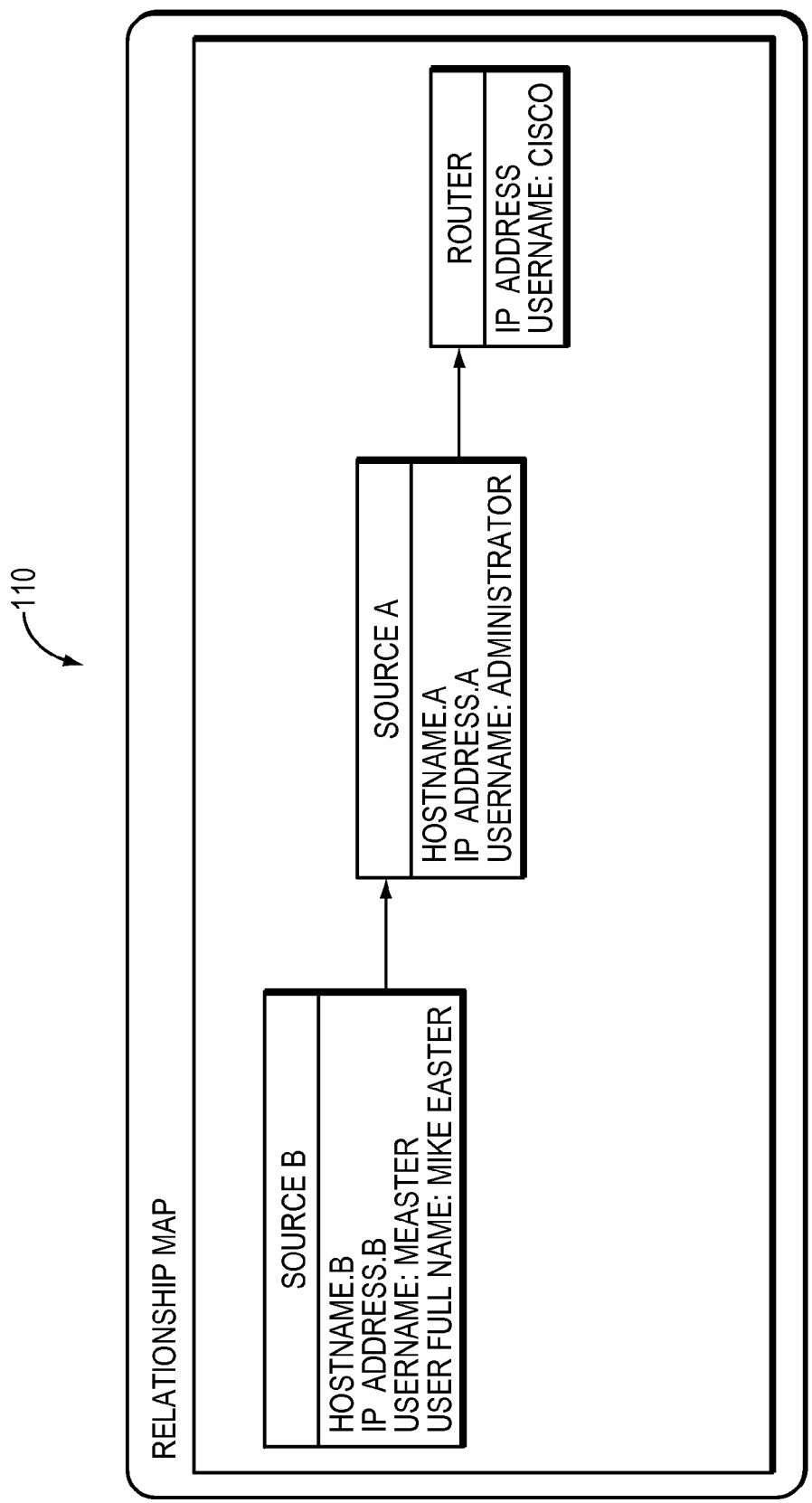
FIG. 8 is an example implementations of the current technique in which a result sets of a query are combined.

FIG. 8 illustrates an example implementation of the current technique in which result sets of the first and second queries are combined. The content bundle executes a third query using the session identifier indicated by the second result set displayed in user interface 105. The third query retrieves a list of configuration changes made during the session associated with the session identifier. Steve analyzes the list of configuration changes to determine whether a change included in the list of configuration changes indicates a possible security risk for an organization. Further, the list of configuration changes is stored by Steve in an incident investigation file.

With respect to the second use case, Steve continues the security investigation using a source IP address for the session associated with the session identifier. The content bundle executes a fourth query to retrieve login information for the source IP address such that the fourth query retrieves information regarding which users logged in the router and logged off from the router during the time frame of the session. Steve analyzes the login information and determines that only one user login has been active using the source IP address on the router. However, Steve determines that the user login is associated with a local account named "Administrator" and originated from a second IP address (referred to as "source B IP address"). Further, Steve stores the login information in the incident investigation file and continues the security investigation. Further, Steve executes a query on event logs of a system associated with the source B IP address to determine who has logged into the system. Based on the event logs, Steve determines that a user named "Mike Easter" logged into the system. Next, the content bundle executes a fifth query on the active directory to validate that Mike Easter indeed logged into the system.

Referring back to FIG. 8, user interface 110 indicates a mapping between a user name and an IP address. The mapping indicates that Mike Easter performed an authorized configuration update as Mike also works in the network operations group and is not an unknown user.

For example, the third use case describes a scenario in which Steve is assigned a security investigation to search for users that have logged into a specific system. For example, in such a use case, if no factory or custom content bundle exists on a network that may perform the security investigation, a basic search content bundle may be created on data analysis platform 22 and used for the security investigation. The basic search content bundle includes a set of actions that are described below herein. First, the basic search content bundle invokes a function call that displays a query generator via a user interface to a user for creating a SQL or MDX query. Steve uses the user interface to select variables and constraints as input values to a query. The function call provides a newly created SQL or MDX query generated by the user interface. Next, the basic search content bundle invokes the SQL or MDX query generated by the user interface. A result set is created when the SQL/MDX query is executed on data analysis platform 22. Next, Steve may optionally execute a rendering content bundle that may perform a set of actions. The set of actions of the rendering content bundle includes a first action that sends a request to Steve to select a result set that may be provided as an output, a second action that sends a request to Steve to choose a rendering method, and a third action that renders the result set as a bar chart based on selection of the rendering method by Steve.

For example, the fourth use case describes a scenario in which Steve analyzes a root cause for an operational failure in a system of an organization. For example, in such a use case, Steve receives a call that an internal application of the organization that is based on a three tier architecture is no longer processing requests for a subset of employees of the organization. Thus, a content bundle may analyze transaction logs for all applications executing in the three tier architecture and all systems supporting those applications in order to determine a root cause for a problem causing the operational failure, scope of the problem and the root cause of the problem.

For example, the fifth use case describes a scenario in which Steve performs a security audit of activities of a user. For example, in such a use case, Steve receives a call that a desktop system of an employee named "Tony Smith" has been accessed by an unauthorized user. Using a content bundle, Steve may determine a list of systems accessed by the desktop system of Tony, and information regarding data that may have been accessed by the unauthorized user.

For example, the sixth use case describes a scenario in which Vicky analyzes whether a database change that is inconsistent with a scheduled workflow has occurred in a system. For example, in such a use case, Vicky performs a security audit of an employee record database of an enterprise. For example, the employee record database may only be updated between midnight to 5 AM Easter Standard Time (EST), Monday through Friday. Thus, Vicky must determine whether a change has been made to the employee record database at a time that is outside this time window described above herein. Therefore, Vicky may create a content bundle that includes the following set of actions. First, the content bundle requires that Vicky either provides input data to the content bundle such that the input data may include information such as an IP address or upload a CSV file including the IP address of the employee record database that is being analyzed as an input. Secondly, the content bundle requires that Vicky provides a time window as an input to the content bundle based on which changes to the employee record database are permitted. Thirdly, the content bundle executes a SQL/MDX query on the data analysis platform 22 for reviewing database logs based on the IP address in order to determine whether a change has been made outside the time window provided by Vicky. Next, the content bundle generates output data including a list of IP addresses in form of a table that provides information such as IP addresses, and data and time information regarding changes that has been made outside the time window. Lastly, Vicky may optionally use the output of the content bundle and provide the output to another content bundle for mapping names of users to the list of IP addresses in order to determine who accessed a system that may resulted in a change to the employee record database.

For example, the seventh use case describes a scenario in which Steve performs a productivity review using a content bundle. For example, in such a use case, Steve receives a request to create a report that indicates a number of emails that are being sent to customers by members of a sale team. A content bundle is created that includes a set of actions that are described below herein. First, the content bundle requires Steve to either provide email addresses of the members of the sales team as input data or upload a CSV file including email addresses of the members of the sales team. Next, the content bundle requires Steve to provide input data such as a time period for review, and a list of domains that are considered internal to the sales team. Next, the content bundle executes a SQL query on email server logs and retrieves email transaction data associated with the members of the sales team for the time period provided by Steve. Next, the content bundle analyzes the email transaction data that is generated by the content bundle as output data by comparing the output data with the list of domains, and updates the output data by removing information associated with emails sent to addresses corresponding to internal domains or domains that are considered out of scope. Next, the content bundle produces a result set in a tabular format such that the result set includes email addresses and a number of messages sent by each email address to each domain of a set of domains. The result set is provided to Steve via a user interface. Lastly, Steve may optionally download a PDF version of the result set for emailing the result set.

For example, the eight use case describes a scenario in which Steve investigates unauthorized access of critical systems. For example, in such a use case, Steve analyzes access logs of servers of an organization. The servers include confidential and regulated information. The organization has a policy indicating that the information on the servers may only be accessed by known endpoints (e.g., IP addresses) in a specific subnet. Steve may create and execute a content bundle to determine whether an unauthorized user has accessed a critical system. The content bundle includes a set of actions that are described below herein. First, the content bundle requires Steve to either provide an IP address as input data or upload a CSV file including an IP address of a system. However, Steve may provide a host name or any one of the known identification of the critical system as input data. Next, the content bundle requires Steve to either provide a subnet as input data or upload a CSV file including a set of subnets (also referred to as "white list") such that each subnet of the set of subnets is allowed to access data on the critical system. Next, the content bundle executes a SQL/MDX query on data analysis platform 22. The SQL/MDX query retrieves access logs, change logs, and administration logs in order to determine whether any source IP address is outside the scope of the subnet or the set of subnets. Next, the content bundle generates output data in a tabular form in such a way that the output data includes a list of IP addresses date and time information, and information indicating a type of data accessed on the critical system. Steve may optionally map the list of IP addresses to user names by executing another content bundle in order to determine names of users that may have accessed the critical system.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing analysis of activity data, the method comprising:
   analyzing activity data for a security investigation by using a content bundle, wherein the content bundle specifies a set of actions, wherein the activity data is analyzed on a data analysis system based on the set of actions specified in the content bundle, wherein the set of actions indicates a workflow for performing the security investigation, wherein the activity data is gathered by an event management system, wherein the content bundle is managed by a security practitioner;
   performing the set of actions on the activity data based on a set of inputs provided to the content bundle, wherein performing each action of the set of actions includes invoking an operation on the data analysis system; and
   providing results of analysis of the activity data in a format based on a set of outputs configured for the content bundle.

2. The method of claim 1, wherein the activity data is collected by a log management system.

3. The method of claim 1, wherein the content bundle includes an XML file, wherein the XML file is parsed by a content engine in a platform independent manner.

4. The method of claim 1, wherein each action of the set of actions invokes an operation on a data analysis platform.

5. The method of claim 1, wherein the content bundle is selected from the group consisting of a custom content bundle and a factory content bundle, wherein the custom content bundle is created by a user, wherein the factory content bundle is provided to a user.

6. The method of claim 1, wherein the content bundle is associated with an identifier, wherein the identifier uniquely identifies the content bundle.

7. The method of claim 1, further comprising:
   providing an output of the content bundle to a second content bundle, wherein the output of the content bundle is used as an input for the second content bundle.

8. The method of claim 1, wherein the content bundle includes metadata, wherein the metadata describes the content bundle.

9. The method of claim 1, further comprising:
   organizing the content bundle based on a category and a subcategory.

10. The method of claim 1, wherein the content bundle is selected by a user for installation on a data analysis platform.

11. A system for use in managing analysis of activity data, the system comprising:
    first logic analyzing activity data for a security investigation by using a content bundle, wherein the content bundle specifies a set of actions, wherein the activity data is analyzed on a data analysis system based on the set of actions specified in the content bundle, wherein the set of actions indicates a workflow for performing the security investigation, wherein the activity data is gathered by an event management system, wherein the content bundle is managed by a security practitioner;
    second logic performing the set of actions on the activity data based on a set of inputs provided to the content bundle, wherein performing each action of the set of actions includes invoking an operation on the data analysis system; and
    third logic providing results of analysis of the activity data in a format based on a set of outputs configured for the content bundle.

12. The system of claim 11, wherein the activity data is collected by a log management system.

13. The system of claim 11, wherein the content bundle includes an XML file, wherein the XML file is parsed by a content engine in a platform independent manner.

14. The system of claim 11, wherein each action of the set of actions invokes an operation on a data analysis platform.

15. The system of claim 11, wherein the content bundle is selected from the group consisting of a custom content bundle and a factory content bundle, wherein the custom content bundle is created by a user, wherein the factory content bundle is provided to a user.

16. The system of claim 11, wherein the content bundle is associated with an identifier, wherein the identifier uniquely identifies the content bundle.

17. The system of claim 11, further comprising:
    fourth logic providing an output of the content bundle to a second content bundle, wherein the output of the content bundle is used as an input for the second content bundle.

18. The system of claim 11, wherein the content bundle includes metadata, wherein the metadata describes the content bundle.

19. The system of claim 11, further comprising:
    fourth logic organizing the content bundle based on a category and a subcategory.

20. The system of claim 11, wherein the content bundle is selected by a user for installation on a data analysis platform.

* * * * *